US008650172B2

(12) United States Patent
Song et al.

(10) Patent No.: US 8,650,172 B2
(45) Date of Patent: Feb. 11, 2014

(54) SEARCHABLE WEB SITE DISCOVERY AND RECOMMENDATION

(75) Inventors: Yang Song, Kirkland, WA (US); Li-wei He, Redmond, WA (US); Scott Kirk Imig, Redmond, WA (US); Robert L. Rounthwaite, Fall City, WA (US); Nam Hoang Nguyen, Lowell, MA (US)

(73) Assignee: Microsoft Corporation, Redmond, WA (US)

( * ) Notice: Subject to any disclaimer, the term of this patent is extended or adjusted under 35 U.S.C. 154(b) by 230 days.

(21) Appl. No.: 12/715,360

(22) Filed: Mar. 1, 2010

(65) Prior Publication Data
US 2011/0213761 A1  Sep. 1, 2011

(51) Int. Cl.
*G06F 17/30* (2006.01)
*G06F 7/00* (2006.01)

(52) U.S. Cl.
USPC .......................................... 707/706; 707/751

(58) Field of Classification Search
USPC ................................................ 707/706, 751
See application file for complete search history.

(56) References Cited

U.S. PATENT DOCUMENTS

| | | | |
|---|---|---|---|
| 6,687,696 B2 * | 2/2004 | Hofmann et al. ...... | 707/999.004 |
| 6,895,406 B2 * | 5/2005 | Fables et al. .................. | 707/765 |
| 6,993,586 B2 * | 1/2006 | Chen et al. .................... | 709/228 |
| 7,058,626 B1 | 6/2006 | Pan et al. | |
| 7,092,936 B1 * | 8/2006 | Alonso et al. .................. | 707/737 |
| 7,328,216 B2 * | 2/2008 | Hofmann et al. .......... | 707/999.1 |
| 7,617,205 B2 * | 11/2009 | Bailey et al. ........... | 707/999.002 |
| 7,716,225 B1 * | 5/2010 | Dean et al. .................... | 707/748 |
| 7,743,054 B2 * | 6/2010 | Sasai ............................ | 707/721 |
| 7,774,339 B2 * | 8/2010 | White et al. .................. | 707/722 |
| 7,778,948 B2 * | 8/2010 | Johnson et al. ................ | 706/45 |
| 7,792,811 B2 * | 9/2010 | Nagarajayya ................ | 707/706 |
| 7,860,871 B2 * | 12/2010 | Ramer et al. .................. | 707/751 |
| 7,949,659 B2 * | 5/2011 | Chakrabarti et al. ......... | 707/732 |
| 8,082,511 B2 * | 12/2011 | Sobotka et al. .............. | 715/758 |
| 2004/0034652 A1 * | 2/2004 | Hofmann et al. ............. | 707/102 |
| 2004/0260574 A1 * | 12/2004 | Gross ............................... | 705/1 |
| 2005/0165753 A1 | 7/2005 | Chen | |
| 2005/0278321 A1 | 12/2005 | Vailaya | |

(Continued)

OTHER PUBLICATIONS

Arguello, J., F. Diaz, J. Callan, J.-F. Crespo, Sources of evidence for vertical selection, Proc. of the 32nd Annual Int'l ACM SIGIR Conf. on Research and Development in Info. Retrieval, SIGIR 2009, Jul. 19-23, 2009, pp. 315-322, Boston, MA, USA.

(Continued)

*Primary Examiner* — Pavan Mamillapalli
(74) *Attorney, Agent, or Firm* — Dan Choi; Carole Boeliitz; Micky Minhas

(57) ABSTRACT

A searchable web site discovery and recommendation system and method for discovering and recommending searchable web sites to a user of a search engine. In general, given a search query by a user embodiments of the system and method discover and then recommend a list of searchable web sites. Embodiments of the system and method discover and recommend searchable web sites using client-side query behavior logs. A set of descriptive features is automatically extracted from the logs. In addition, embodiments of the system and method expand the initial search query by submitting the query to a general search engine and leveraging snippets from the search engine results. Embodiments of the system and method model a conditional probability of a searchable web site based on four components and the extracted descriptive features. A ranked list of recommended searchable web sites is obtained from the conditional probability and displayed to a user.

20 Claims, 10 Drawing Sheets

(56) References Cited

U.S. PATENT DOCUMENTS

| | | | |
|---|---|---|---|
| 2006/0059225 A1* | 3/2006 | Stonehocker et al. | 709/202 |
| 2007/0038616 A1 | 2/2007 | Guha | |
| 2008/0004989 A1* | 1/2008 | Yi | 705/27 |
| 2008/0016046 A1 | 1/2008 | Guha | |
| 2008/0071772 A1 | 3/2008 | Rosenoff | |
| 2008/0104004 A1* | 5/2008 | Brave et al. | 706/45 |
| 2008/0134042 A1* | 6/2008 | Jankovich | 715/733 |
| 2008/0189269 A1 | 8/2008 | Olsen | |
| 2008/0306937 A1* | 12/2008 | Whilte et al. | 707/5 |
| 2009/0132484 A1 | 5/2009 | Massie | |
| 2009/0248661 A1* | 10/2009 | Bilenko et al. | 707/5 |
| 2010/0049498 A1* | 2/2010 | Cao et al. | 704/9 |

OTHER PUBLICATIONS

Baeza-Yates, R. A., B. A. Ribeiro-Neto, Modern infor. retrieval, Jan. 1999, pp. 1-38, ACM Press / Addison-Wesley.

Beitzel, S. M., E. C. Jensen, D. D. Lewis, A. Chowdhury, O. Frieder, Automatic classification of Web queries using very large unlabeled query logs, ACM Trans. Inf. Syst., Apr. 2007, vol. 25, No. 2.

Bhavnani, S. K., Domain-specific search strategies for the effective retrieval of healthcare and shopping information, Extended Abstracts of the 2002 Conf. on Human Factors in Computing Sys's, CHI 2002, Apr. 20-25, 2002, pp. 610-611, Minneapolis, Minnesota.

Brenes, D. J., D. Gayo-Avello, K. Pérez-González, Survey and evaluation of query intent detection methods, Proc. of the 2009 Workshop on Web Search Click Data, Feb. 9, 2009, pp. 1-7, Barcelona, Spain.

Chang, W., P. Pantel, A.-M. Popescu, E. Gabrilovich, Towards intent-driven bidterm suggestion, Proc. of the 18th Int'l Conf. on World Wide Web, WWW 2009, Apr. 22, 2009, pp. 1093-1094, Madrid, Spain.

Chau, M., X. Fang, O. R. L. Sheng, Analysis of the query logs of a Web site search engine, J. of the American Society for Info. Science and Technology, JASIST 2005, Aug. 2005, vol. 56, No. 13, pp. 1363-1376.

Diaz, F., J. Arguello, Adaptation of offline vertical selection predictions in the presence of user feedback, Proc. of the 32nd Annual Int'l ACM SIGIR Conf. on Research and Development in Info. Retrieval, SIGIR 2009, Jul. 19-23, 2009, pp. 323-330, Boston, MA, USA.

Diaz, F., Integration of news content into web results, Proc. of the Second ACM Int'l Conf. on Web Search and Data Mining, Feb. 9-12, 2009, pp. 182-191, Barcelona, Spain.

Diemert, E., G. Vandelle, Unsupervised query categorization using automatically-built concept graphs, Proc. of the 18th Int'l Conf. on World Wide Web, WWW 2009, Apr. 20-24, 2009, pp. 461-470, Madrid, Spain.

Hu, J., G. Wang, F. H. Lochovsky, J.-T. Sun, Z. Chen, Understanding user's query intent with wikipedia, Proc. of the 18th Int'l Conf. on World Wide Web, WWW 2009, Apr. 20-24, 2009, pp. 471-480, Madrid, Spain.

Jansen, B. J., A. Spink, T. Saracevic, Real life, real users, and real needs: A study and analysis of user queries on the web, Inf. Process. Manage., Mar. 2000, vol. 36 No. 2, pp. 207-227.

Li, X., Y.-Y. Wang, A. Acero, Learning query intent from regularized click graphs, Proc. of the 31st Annual Int'l ACM SIGIR Conf. on Research and Development in Info. Retrieval, SIGIR 2008, Jul. 20-24, 2008, pp. 339-346, Singapore.

Mackay, D. J. C., L. C. B. Peto, A hierarchical Dirichlet language model, Natural Language Eng'g, 1994, vol. 1, pp. 1-9.

Madhavan, J., D. Ko, L. Kot, V. Ganapathy, A. Rasmussen, A. Y. Halevy, Google's deep web crawl, PVLDB Aug. 24-30, 2008, pp. 1241-1252, vol. 1, No. 2, Auckland, New Zealand.

Salton, G., C. Buckley, Term-weighting approaches in automatic text retrieval, Inf. Process. and Manage, Jan. 1988, pp. 513-523, vol. 24, No. 5.

Shen, D., J.-T. Sun, Q. Yang, Z. Chen, Building bridges for web query classification, Proc. of the 29th Annual Int'l ACM SIGIR Conf. on Research and Development in Info. Retrieval, SIGIR 2006, pp. 131-138, Aug. 6-11, 2006, Seattle, Washington, USA.

Spall, J. C., Implementation of the simultaneous perturbation algorithm for stochastic optimization, IEEE Transactions on Aerospace and Electronic Systems, Jul. 1998, vol. 34, No. 3, pp. 817-823.

Spall, J. C., Multivariate stochastic approximation using a simultaneous perturbation gradient approximation, IEEE Transactions on Automatic Control, Mar. 1992, pp. 332-341, vol. 27, No. 3.

Zhai, C., J. D. Lafferty, A study of smoothing methods for language models applied to ad hoc information retrieval, ACM Trans. on Info Sys's, Apr. 2004, pp. 179-214, vol. 22, No. 2.

Nguyen, "Searchable Web Sites Discovery and Recommendation", Proceedings of the 18th International World Wide Web Conference, Apr. 20-24, 2009.

\* cited by examiner handmade dolls

Web  [+] Show options...

Handmade dolls of every race
Handmade dolls of every race. Karens Kids, Lil Thelma and Friends, Sweet Pea Girls, Sweet Pea Nursery Reborns and Sweet Pea Doll Clothes.
www.karenskids.net/ - Cached - Similar

Beth Robinson's Strange Dolls
Beth Robinson is a self-taught New England artist who has been making and selling hand made dolls since 2003. Although she found success with her oil ...
www.strangedolls.net/ - Cached - Similar

Dolls
Excellent quality handmade 18 inch doll clothes for American Girl dolls and ... We carry a variety of handmade dolls. Our line of handmade dolls include ...
www.craftsfaironline.com/Doll.html - Cached - Similar

FIG. 7

SEARCHABLE WEB SITE DISCOVERY AND RECOMMENDATION

BACKGROUND

In addition to a number of popular general search engines available, many commercial and non-commercial web sites offer their own search engines allowing a searching capability for specialized content. By way of example, some web sites offer specific search engines that search for movie-related topics, others for health-related questions, and still others for items to purchase. Even though many general search engines are able to index a vast number of web pages and have increasingly sophisticated ranking algorithms, performing searches using a web site search engine directly often has distinct advantages.

First, general search engines may have limited or no access to proprietary content or database. Second, more domain-specific information can be used for ranking the results. For example, given a search query "pinot noir", a wine web site might return the wines ranked by taste score, price, or both. Third, the search results are often presented with a more appropriate format or user interface. Fourth, since each web site usually focuses on a specific domain or product, the user has to do less filtering of totally unrelated results.

Research has shown that the click-through rates (CTR) of differ between web site search engines and general search engines. The CTR is a measure of the interest in which a user shows in search results presented to him. In particular, for the same set of queries a user is more likely to make clicks when she issues queries on domain-specific web sites than on a general search engine. Thus, web site search engines are more likely to return search results which a user is interested The problem is getting the user to a specific web site. Users often have trouble finding domain-specific sites to search. Recently there has been attention given to this problem of user intent classification in information retrieval. This work focuses on categorizing a given search query into a general intent (such as news, images, automobiles, and so forth) that can be identified as macro vertical/intent selection. However, many of these techniques pick only high-level categories is because they use supervised learning methods that require manual labeling of training data. In other words, these approaches require search queries to be labeled by human judges. These approaches therefore are quite expensive and unable to make prompt response to topic evolution over time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the searchable web site discovery and recommendation system and method discover and recommend searchable web sites. Given a search query by a user, embodiments of the system and method first discover and then recommend a list of searchable web sites ranked by relevance. This list can be used to complement the web page results and advertisements from a general search engine.

Embodiments of the system and method discover and recommend searchable web sites by obtaining query behavior from client-side query behavior logs (such as client-side browsing logs). A set of descriptive features is automatically extracted from the client-side query behavior logs to construct an n-gram language model for searchable web site recommendation. Moreover, searchable web sites typically receive fewer queries than a general-purpose search engine. Thus, a robust discovery and recommendation system needs to be able to discover and recommend searchable web sites with sparse query volume. Embodiments of the system and method use an efficient query expansion technique to address the query sparseness issue by leveraging the search engine result snippets. One way that this can be obtained is by submitting a user's search query to a general search engine.

Embodiments of the searchable web site discovery and recommendation system and method model a conditional probability of a searchable web site being relevant to a given search query in terms of three general components. These three components are the language model of the search query, the language model of the content within the searchable web site, and the reputation of the web site's searching capability (or static rank). The language models for search queries and searchable web sites are built using information mined from client-side query behavior logs.

The static rank for a particular searchable site is determined using the set of descriptive features. These features include features extracted from the client-side query behavior logs (such as number of queries that are submitted to this site), and features from the general search engines (such as the number of web pages that indexed for the site, number of clicks per query, and the dwell-time that a user spends on the search result page and the clicked result web pages). Embodiments of the system and method also automatically optimize a weight for each kind of feature to optimize the ranking performance.

The descriptive features are used in the recommendation problem to formulate a probabilistic model, $P(v/q)$. The conditional probability of a searchable web site v given a search query q is computed in term of four components. The first component is the query language model, $P(w/q)$, the second component is the web site language model, $P(w/v)$, the third component is the inverse document frequency, $1/P(w)$, and the fourth component is the static rank, $P(v)$. Embodiments of the system and method compute the conditional probability using these components and descriptive features to obtain a ranked list of recommended searchable web sites. This list can be displayed to the user by itself or displayed alongside general search results.

Embodiments of the searchable web site discovery and recommendation system and method contain at least two features. First, instead of using queries from server-side search engine logs, some embodiments of the system and method leverage user search queries from client-side browsing logs of a widely-distributed web browser. The client-side logs offer a rich set of information that can be leveraged for site activity detection (such as in-site queries, dwell-time on a page, user click sequence, unique number of users on a site, and so forth). Second, embodiments of the system and method use a completely unsupervised approach for searchable site recommendation and do not involve hand labeling of any data or features. The model is capable of automatically extracting features from logs and learning optimal weights for each feature. With the ability to adapt itself, embodiments of the system and method can continuously refine the model over time.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 7 illustrates an example of leveraging snippets from a general search engine to expand the query language model.

DETAILED DESCRIPTION

In the following description of embodiments of the searchable web site discovery and recommendation system and method reference is made to the accompanying drawings, which form a part thereof, and in which is shown by way of illustration a specific example whereby embodiments of the searchable web site discovery and recommendation system and method may be practiced. It is to be understood that other embodiments may be utilized and structural changes may be made without departing from the scope of the claimed subject matter.

I. System Overview

Figure 1:
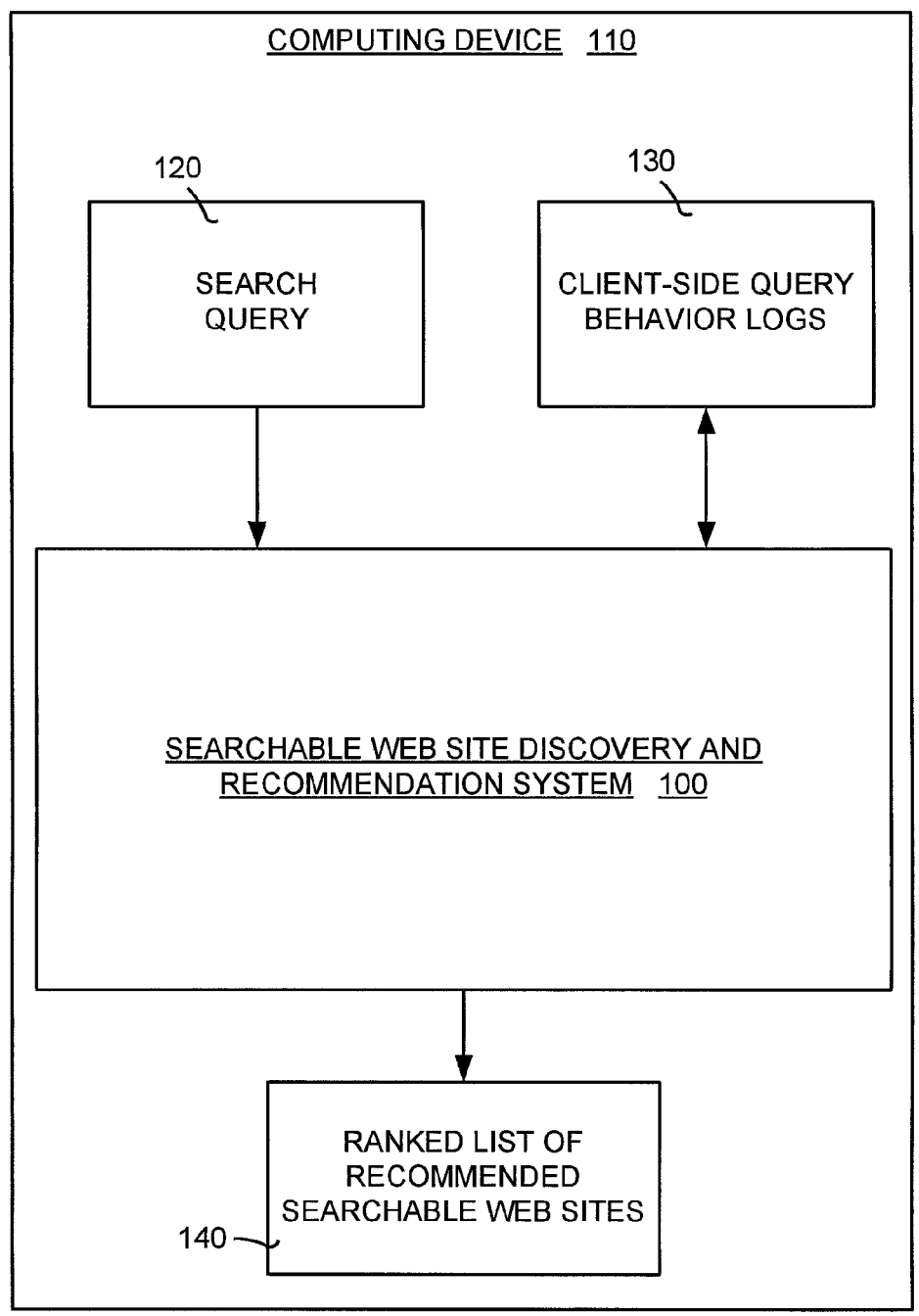
FIG. 1 is a block diagram illustrating a general overview of embodiments of the searchable web site discovery and recommendation system and method implemented on a computing device.

FIG. 1 is a block diagram illustrating a general overview of embodiments of the searchable web site discovery and recommendation system 100 and method implemented on a computing device 110. In general, embodiments of the searchable web site discovery and recommendation system 100 and method take a search query 120 and discover and recommend searchable web sites. The searchable web sites are first discovered using data obtained from client-side query behavior logs 130. These client-side query behavior logs may be obtained by: (1) extracting data from client-side browsing logs to obtain a plurality of descriptive features for each searchable web site; (2) requesting query logs from searchable web site providers; (3) by obtaining idealized query sets that describe ideal queries and their frequencies, by authoring, by using click behavior, or by requesting from the searchable web site providers; or (4) using random walks on a general search engine's query-click graph web site search engines as terminal states. Embodiments of the system 100 and method then take the search query 120, client-side query behavior logs 130, and the discovered searchable web sites and process them to obtain a ranked list off recommended searchable web sites 140. This list can be displayed to the user by itself or displayed alongside general search results.

Figure 2:
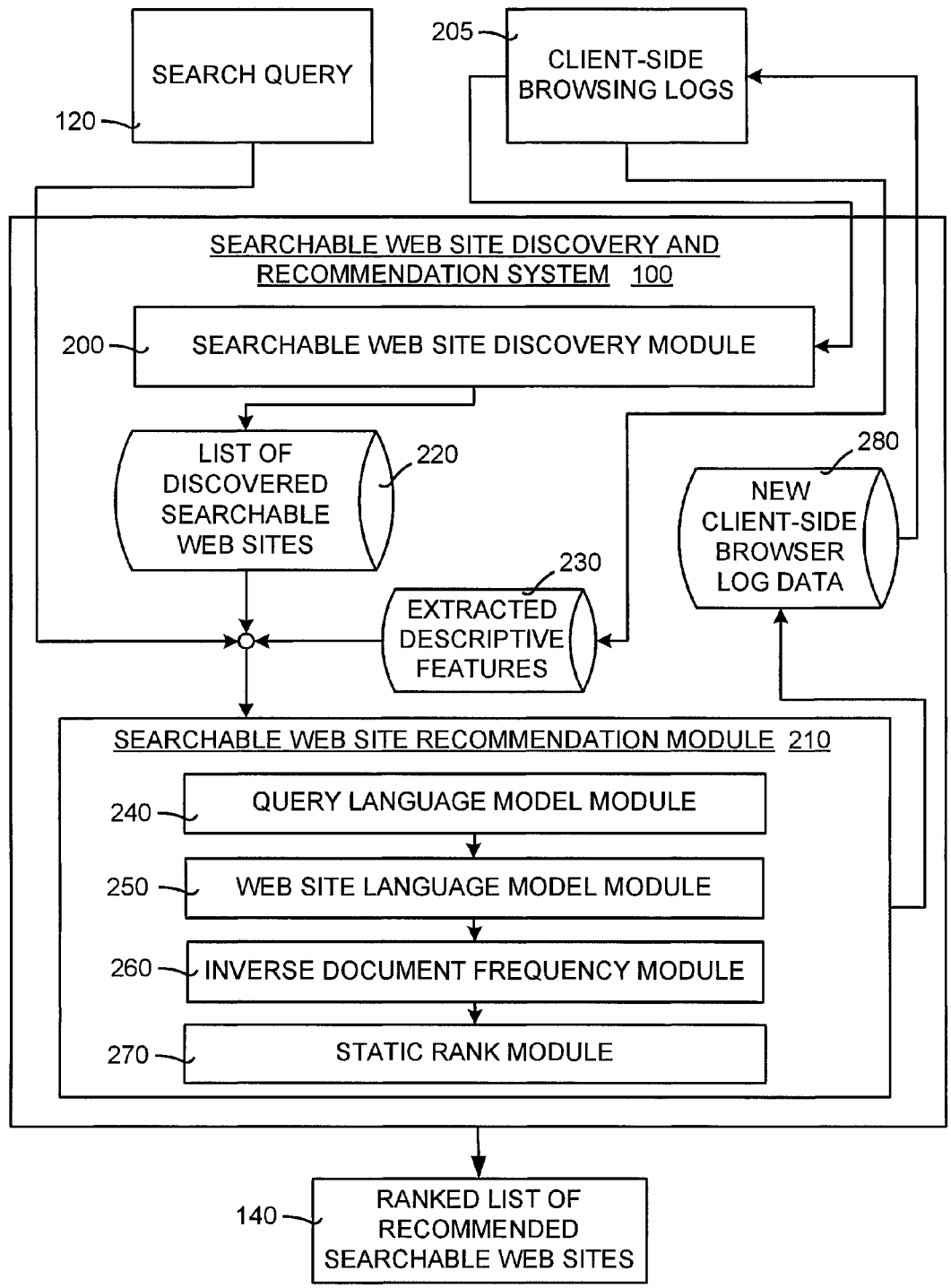
FIG. 2 is a block diagram illustrating modules and data used in embodiments of the searchable web site discovery and recommendation system and method shown in FIG. 1.

FIG. 2 is a block diagram illustrating modules and data used in embodiments of the searchable web site discovery and recommendation system 100 and method shown in FIG. 1. In general, embodiments of the searchable web site discovery and recommendation system 100 include modules for discovering searchable web sites and modules for ranking and recommending the discovered searchable web sites. More specifically, embodiments of the searchable web site discovery and recommendation system 100 include a searchable web site discovery module 200 that discovers searchable web sites and a searchable web site recommendation module 210 that ranks and recommends the discovered searchable web sites.

Embodiments of the searchable web site discovery module 200 input the search query 120 and client-side query behavior logs, which are shown in this embodiment as client-side browsing logs 205. After processing by embodiments of module 200 the output is a list of discoverable searchable web sites. Inputs to embodiments of the searchable web site recommendation module 210 include the list of discovered searchable web sites 220, the search query 120, and a plurality of descriptive features 230 that were automatically extracted from the client-side browsing logs.

Embodiments of the searchable web site recommendation module 210 include a query language model 240 that computes an expanded query language model for each searchable web site, and a web site language model module 250 that determines a web site language model using clicked queries from the client-side browsing logs 205. Embodiments of the searchable web site recommendation module 210 also include an inversed document frequency module 160, which gives higher weights to terms concentrated in a few documents, and a static rank module 270. Embodiments of the static rank module 270 use the extracted descriptive features 230 to statically rank the searchable web sites. The output of embodiments of the system 100 is the ranked list of recommended searchable web sites 140.

Given the current client browser log data, embodiments of the system 100 and method extract potential searchable web sites and submitted queries that then are used to construct the language models for the queries and web sites. When a user (not shown) issues a new query, embodiments of the system 100 and method propose a ranked list of suitable searchable web sites. At this point, new client-side browser log data 280 is collected. This data 280 is used as feedback to update the language models of embodiments of the searchable web site recommendation module 210. This continuous effort can further prune and refine the models on a daily basis, without any human involvement.

II. Operational Overview

Figure 3:
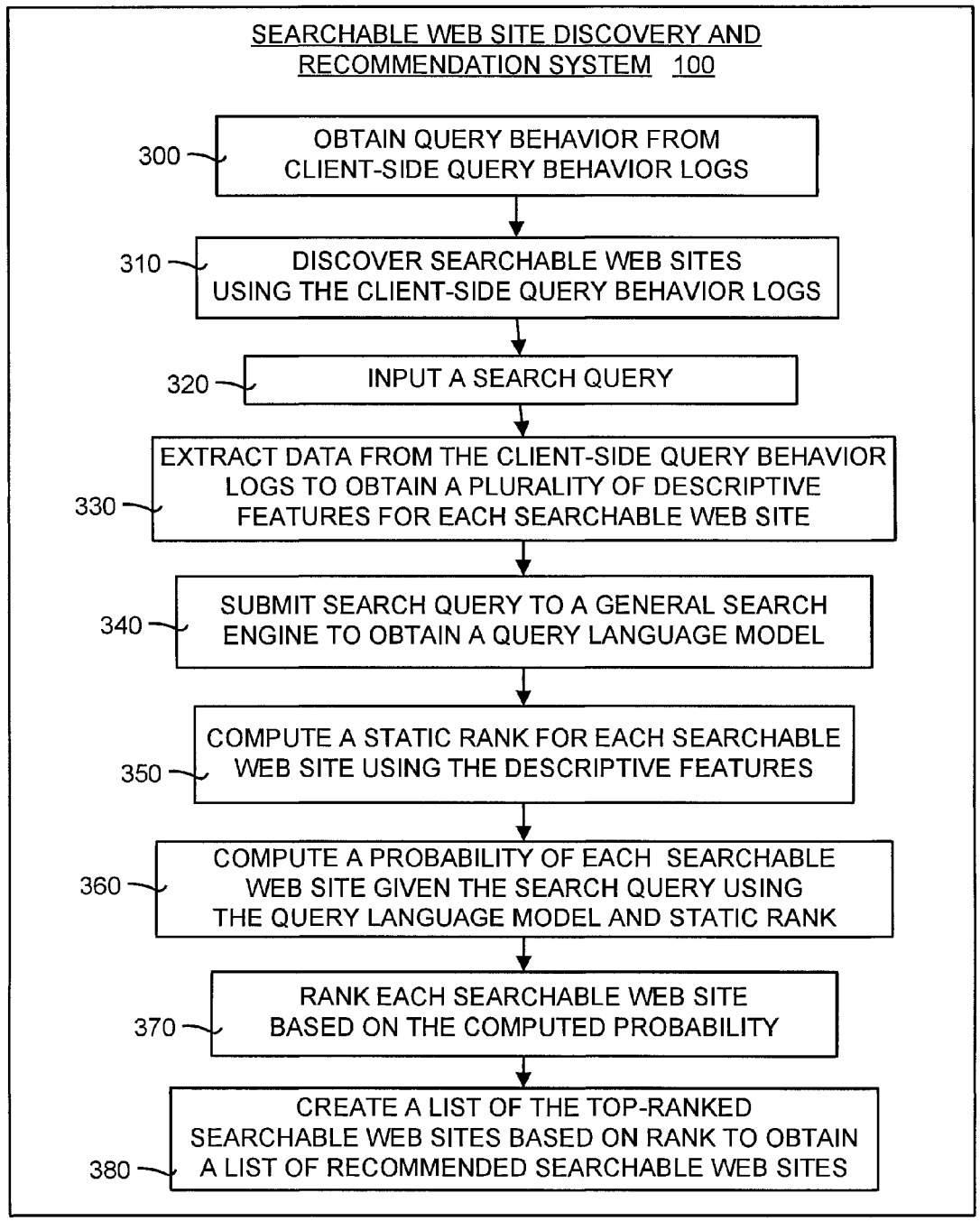
FIG. 3 is a flow diagram illustrating the general operation of embodiments of the searchable web site discovery and recommendation system shown in FIGS. 1 and 2.

FIG. 3 is a flow diagram illustrating the general operation of embodiments of the searchable web site discovery and recommendation system 100 shown in FIGS. 1 and 2. Referring to FIG. 3, the method begins by obtaining query behavior from the client-side query behavior logs (box 300). For example, in some embodiments query behavior is obtained from client-side browsing logs. These logs are gathered from a plurality of clients and contain a complete browsing trail with a many types of descriptive features.

Next, embodiments of the system 100 use the client-side query behavior logs to discover searchable web sites (box 310). As explained in detail below, embodiments of the system can discover quite a large number of potential searchable web sites. Embodiments of the system 100 then drill down into individual sites and use the client-side query behavior logs to determine a ranking of the site and whether the site is recommended to a user.

Embodiments of the system 100 then input a search query (box 320). Data is extracted from the client-side query behavior logs to obtain a plurality of descriptive features for each searchable web site (box 330). In addition, the search query is submitted to a general search engine to obtain a query language model (box 340). As explained in detail below, this query language model is expanded by using snippets from the search results obtained from submitting the search query to the general search engine.

Embodiments of the system 100 also compute a static rank for each searchable web site using the plurality of descriptive features that were extracted previously (box 350). Next, embodiments of the system 100 compute a probability of each searchable web site given the search query (box 360). This probability is computed using the query language model and the static rank. Each searchable web site then is ranked based on the computed probability (box 370). A list of the top-ranked searchable web sites then is created based on the rank of each searchable web site to obtain a list of recommended searchable web sites (box 380).

III. System and Operational Details

The system and the operational details of embodiments of the searchable web site discovery and recommendation system 100 and method now will be discussed. These embodiments include embodiments of the searchable web site discovery module 200, the searchable web site recommendation module 210, the query language model module 240, the web site language model module 250, the inverse document frequency module 260, and the static rank module 270. The system and operational details of each of these modules now will be discussed in detail.

III.A. Searchable Web Site Discovery Module

Figure 4:
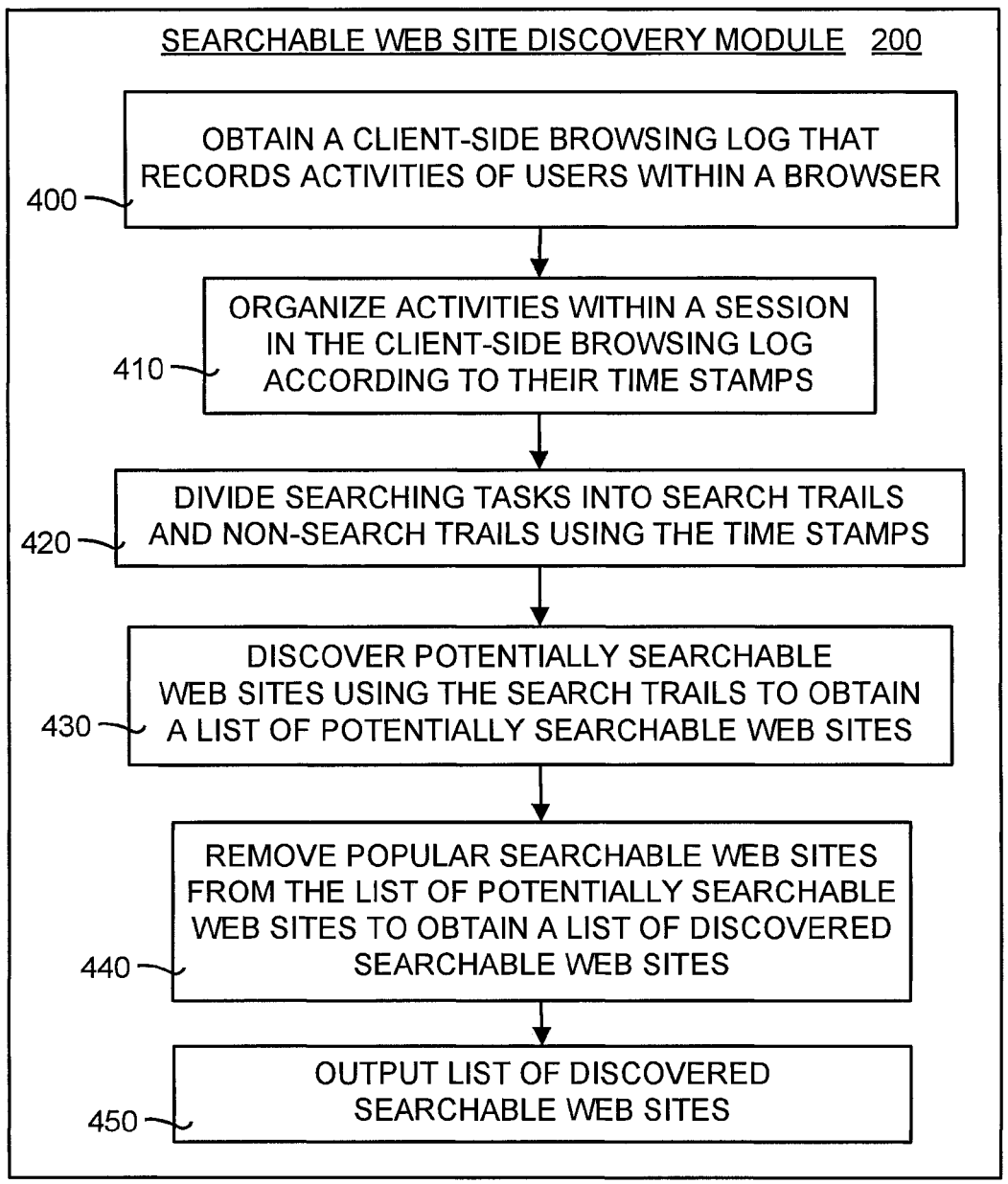
FIG. 4 is a flow diagram illustrating the operational details of embodiments of the searchable web site discovery module shown in FIG. 2.

FIG. 4 is a flow diagram illustrating the operational details of embodiments of the searchable web site discovery module 200 shown in FIG. 2. In general, embodiments of the searchable web site discovery module 200 collect data and discover searchable web sites. More specifically, the operation of the embodiments of the module 200 begins by obtaining the client-side browsing log that records the activities of users within a browser (box 400). The log data used is the client-side browsing log collected from millions of opt-in users of a world-wide distributed browser.

The log data contains a record of users' activities within the browser. The activities for each user are divided into sessions if there is no activity within thirty minutes. Each activity in a session records the following information: (a) unique user identification (ID); (b) clicked URL; (c) referred URL; (d) IP address; (e) time stamp; and, (f) the sequential order within a session. There are many other unrelated fields that are also recorded, but embodiments of the system 100 and method utilize the above-mentioned meta-features.

Next, the activities within a session in the client-side browsing log are organized according to their time stamps (box 410). Specifically, the referred URL is the one from which the current URL is clicked. Therefore, by following the referrer URLs the user activities can be further separated into different trails which can be recognized as user tasks. For example, a user may open a tab of the browser to read news in one window while checking emails in another window.

Using the time stamps the searching tasks are divided into search trails and non-search trails (box 420). Next, embodiments of the module 200 discover potentially searchable web sites using the search trails to obtain a list off potentially searchable web sites (box 430). For discovering potential searchable sites that are unknown (or ranked lower than popular sites) by general search engines, it makes sense to leverage only the non-search trails from the logs. A simple pattern matching rule is used to extract queries from clicked URLs in the logs. For most web sites, the search keywords are passed as parameters in URLs such as "query=". Different parameters are separated using the "&" character.

Embodiments of the module 200 and method focus on the most discriminative parameter for each specialized engine. So for a URL two parameters "query=audo+a6&zip=98034", only the "query" part is extracted. In some embodiments of the module 200 a set of 126 manually extracted patterns are used.

Using this pattern matching criteria many potentially searchable web sites can be discovered. In some embodiments of the module 200 popular (or well-known) searchable web sites are removed from the list of potentially searchable web sites because they are so popular that most general search engines have already performed a good job of recommending these sites when relevant queries are issued (box 440). This leaves a list of discovered searchable web sites. Some embodiments of the module 200 concentrate on the less popular searchable web sites because generally people have more trouble finding these sites. Embodiments of the module 200 then output the list of discovered searchable web sites (box 450).

III.B. Searchable Web Site Recommendation Module

Figure 5:
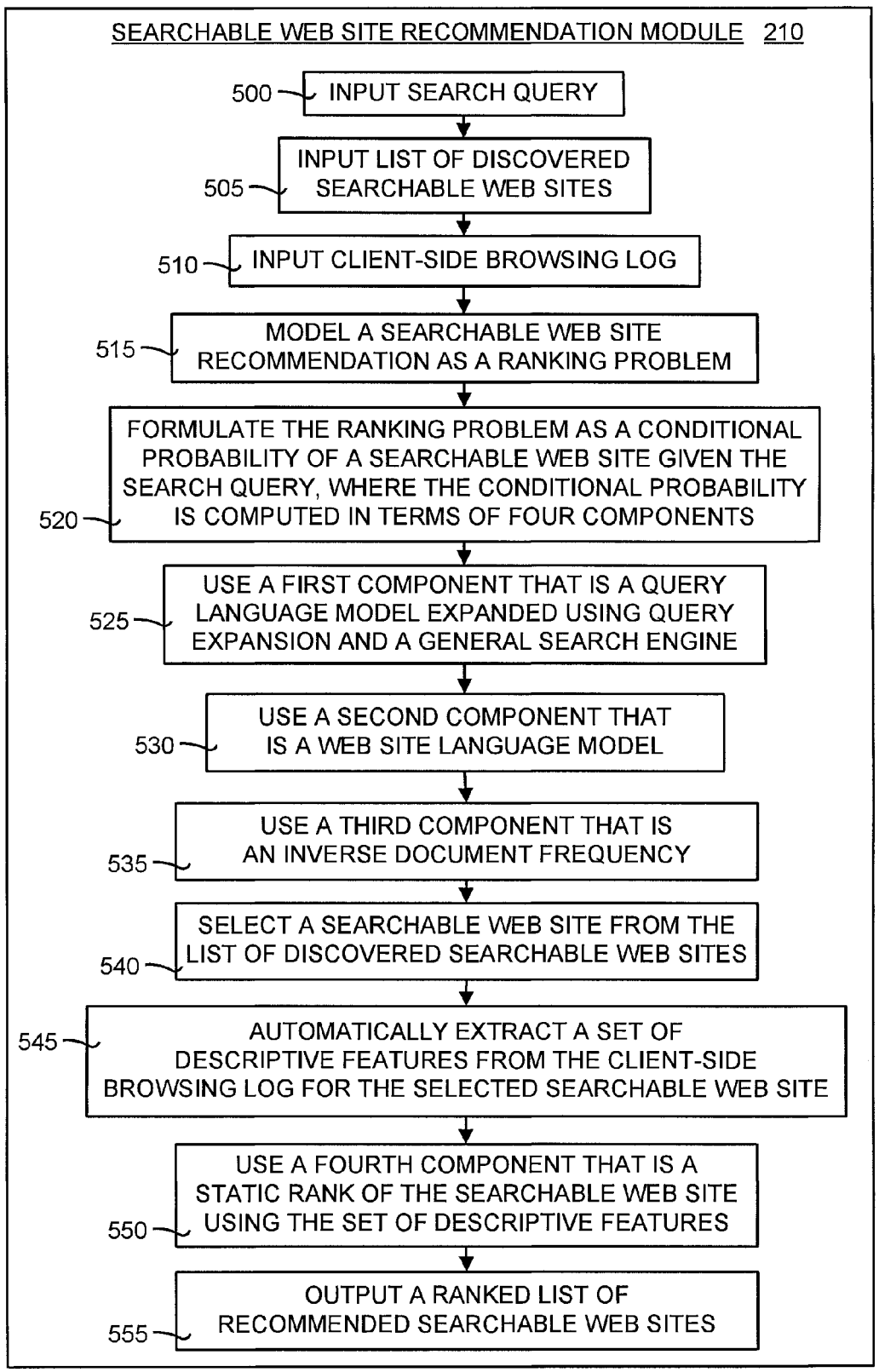
FIG. 5 is a flow diagram illustrating the operational details of embodiments of the searchable web site recommendation module shown in FIG. 2.

FIG. 5 is a flow diagram illustrating the operational details of embodiments of the searchable web site recommendation module 210 shown in FIG. 2. The method begins by inputting a search query (box 500), a list of discovered searchable web sites (box 505), and the client-side browsing log (box 510). Embodiments of the searchable web site recommendation module 210 then model the searchable web site recommendation as a ranking problem, instead of as a classification problem (box 515). In particular, given a search query, embodiments of the module 210 provide a ranked list of the best-matched searchable web sites. In order to model the conditional probability of search engines given search queries, embodiments of the module 210 construct a set of features that can be automatically extracted from the logs.

III.B.1. Feature Generation

The first step of feature generation is to extract searchable web sites as well as the user queries. Specifically, a set of web sites that users have issued search queries to is extracted (denoted as V). In addition, a set of queries per web site is extracted (denoted as $Q_v$ for a site $v \in V$).

In general, embodiments of the of the searchable web site recommendation module 210 construct a feature set that contains one or more features. Moreover, these features contained in the feature set may be combined in many different ways. In one embodiment of the of the searchable web site recommendation module 210 a feature set is constructed that contains seven descriptive features for each searchable web site. These seven descriptive features are used to estimate the reputation of each web site's searching capability. It should be noted that this is different from the web site's PageRank.

Instead, in this embodiment these features measure how much people use the site's search feature and how satisfied they are after each use.

The first descriptive feature is the total number of queries submitted to the site (the cardinality of $Q_v$). This cardinality is denoted as queries(v). This descriptive feature indicates the popularity of the site's search feature.

The second descriptive feature is the number of unique queries submitted to the site. This descriptive feature is denoted as unique queries(v). This feature is a measure of the popularity and topic coverage of the site's search feature.

The third descriptive feature is the average number of clicks per query on site v. This is denoted as clicks(v). This feature identifies whether the user's information need is satisfied.

The fourth descriptive feature is the average dwell-time on the search result page per query on v. This is denoted as dt1(v). This feature accesses the quality of the result links.

The fifth descriptive feature is the average dwell-time on the referred links per query on v. This is denoted as dt2(v). The feature measures the quality of the retrieved information.

The sixth descriptive feature is the number of web pages belonging to the web site that are indexed by a general search engine. This is denoted by Index(v). This is an approximation of the quantity of web pages within v.

The seventh descriptive feature is the entropy of the topic distribution based on the Open Directory Project's (ODP) hierarchy of the web. This is denoted as entropy(v). This feature measures the diversity of the web site's content. Specifically, to compute the ODP-topic distribution entropy for each specialized vertical search engine, some embodiments of the system and method utilize the one-versus-all binary classifiers from 219 of the most popular topics from the ODP hierarchy.

The conditional probability of an ODP topic t given a vertical search engine v is defined as:

$$P(t|v) = \frac{1}{|Q_v|} \sum_{q \in Q_v} f_t(q^*)_\gamma \quad (1)$$

where $f_t(q^*)$ is the calibrated classification output of the binary classifier for the ODP-topic t when applying to the expanded query $q^*$. Hence, the topic entropy of a web site is computed as:

$$\text{entropy}(v) = -\sum_t P(t|v) \log P(t|v).$$

Web sites with low entropies are sought to have better specialty, while more general web sites often have higher entropy scores. For example, a general search engine would have a much higher entropy score than a sports web site than merely focuses on the sport category.

III.B.2. Components Breakdown

Referring again to FIG. 5, embodiments of the module 210 formulate the recommendation problem as the conditional probability of a searchable web site v given a search query q, P(v/q) (box 520). The conditional probability of a searchable web site v given a search query q is computed in term of four components. The first component used by embodiments of the module 210 is the query language model, P(w/q) that is expanded using query expansion and a general search engine (box 525). The second component used by embodiments of the module 210 is the web site language model, P(w/v) (box 530), and the third component is the inverse document frequency, 1/P(w) (box 535).

Embodiments of the module 210 select a searchable web site from the list of discovered searchable web sites (box 540). Next, a set of descriptive features (such as the seven descriptive features described above) is automatically extracted from the client-side browsing log for the selected searchable web site (box 545). Embodiments of the module 210 then use the fourth component that is the static rank, P(v), of the searchable web site using the set of descriptive features (box 550). The output of embodiments of the module 210 is the ranked list of recommended searchable web sites (box 555).

Mathematically, the probabilistic model, P(v/q), can be written as, $$\begin{aligned}P(v|q) &= \sum_{w \in Vocab} P(w, v|q) \\ &= \sum_{w \in Vocab} P(w|q) P(v|q, w) \\ &= \sum_{w \in Vocab} P(w|q) P(v|w) \\ &= \sum_{w \in Vocab} P(w|q) P(w|v) \frac{1}{P(w)} P(v).\end{aligned} \quad (2)$$

In Equation 2), a new variable, w, is introduced that represents the word or term in the vocabulary, which is denoted as Vocab. Hence, the first equation is the summation over all possible values of the variable w of the joint conditional probability, P(w, v/q). In addition, embodiments of the system and method also make an assumption that the term w and the query string q represent redundant information so that P(v/q,w)=P(v/w).

Ideally, queries are modeled with n-gram language models with n>1 while w represents a simple unigram model. However, since many literature works have shown that higher order of language models barely improve the retrieval performance, embodiments of the system and method ignore the order of the terms within the query string. This is a simplified representation where the single term w can effectively explain the information need of a query q in most scenarios. Bayes' rule then is applied for the conditional probability to get, $$P(v|w) = \frac{P(w|v)P(v)}{P(w)}.$$

As can be observed from Equation (2), the conditional probability of a searchable site v given a query q can be broken down into four components. A first component is the conditional probability of a term w given the query q, P(w/q), and a second component is the conditional probability of the term w given the searchable site v, P(w/v). The third component is the inverse of the probability of the term w, 1/P(w), and the fourth components is the prior belief or the static rank of the searchable site v, P(v). Each of these components will now be discussed in detail.

III.B.2.i. First Component: Query Language Model P(w/q)

Figure 6:
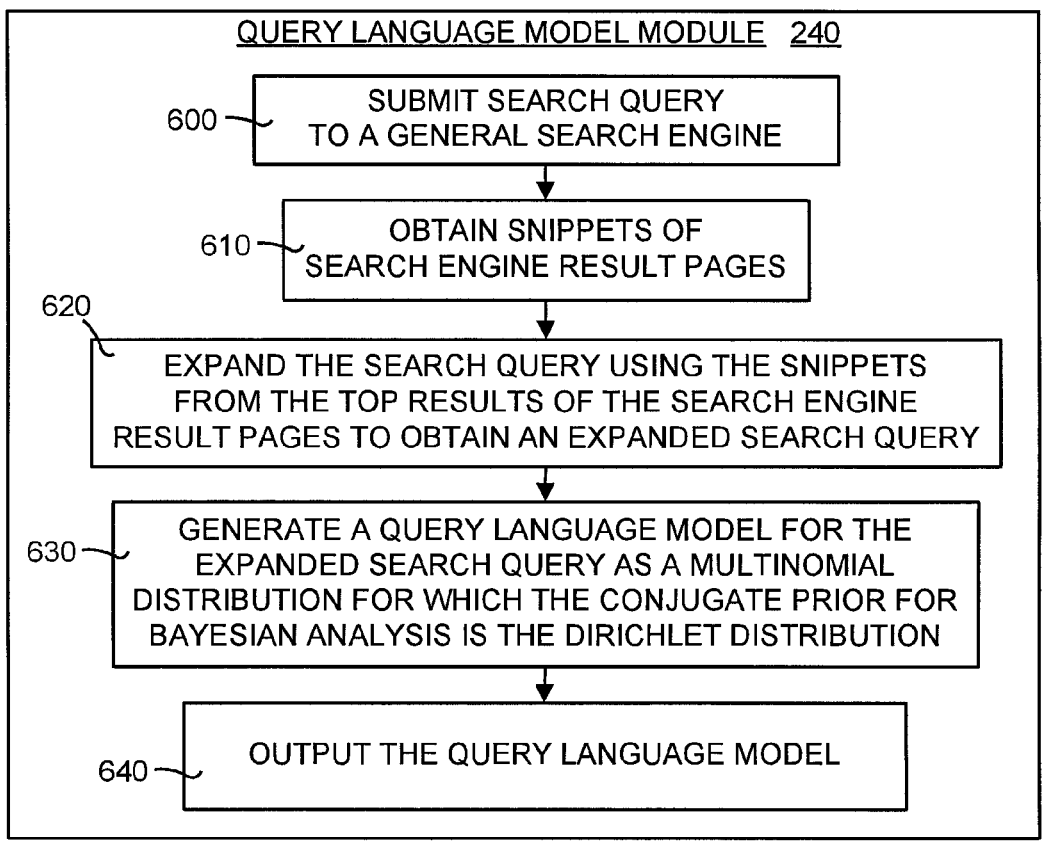
FIG. 6 is a flow diagram illustrating the operational details of embodiments of the query language model module shown in FIG. 2.

FIG. 6 is a flow diagram illustrating the operational details of embodiments of the query language model module 240 shown in FIG. 2. Embodiments of the module 240 first submit the search query to a general search engine (box 600). Next, snippets of the search engine results pages are obtained (box 610). Embodiments of the module 240 then expand the search query using the snippets from the top results of the search engine result pages to obtain an expanded search query (box 620).

Given that typical queries submitted to searchable web sites contain very few keywords, embodiments of the module 240 expand each search query q with the snippets of the top-returned results by submitting the query to a general search engine. Since the snippets on search engine result pages are selected from the most descriptive words of the web page contents, this approach offers excellent free resources for better understanding user intent. This is especially true when the queries are ambiguous. It should be noted that some embodiments of the module 240 also use a web-based encyclopedia as an external source for representation of the search query intent.

More specifically, the titles and the descriptive words both are leveraged for query expansion. FIG. 7 illustrates an example of leveraging snippets from a general search engine to expand the query language model. As shown in FIG. 5, the snippets of search engine result pages, which are circled, are leveraged for query expansion. Some embodiments of the module 240 empirically use the top fifty results from a general search engine for query expansion.

The expanded query is denoted as q*. Hence, the conditional probability of a term w given a query q, P(w/q), is estimated based on the expanded query q*, P(w/q*). Referring again to FIG. 6, embodiments of the module 240 then generate a query language model of P(w/q*) is modeled as a multinomial distribution, for which the conjugate prior for Bayesian analysis is the Dirichlet distribution (box 630). The query language model then is output from embodiments of the module 240 (box 640).

Mathematically, the query language model can be written as, $$P(w \mid q) \simeq P(w \mid q^*) = \frac{tf(w; q^*) + \mu P(w \mid C)}{\sum_{w' \in Vocab} tf(w'; q^*) + \mu} \quad (3)$$

where $\mu$ is the Dirichlet smoothing parameter, tf(w; q*) is the term frequency of a term w in the expanded query q*, and P(w/C) is the language model for the entire expanded training query collection, $$P(w \mid C) = \frac{tf(w; C)}{\sum_{w' \in Vocab} tf(w'; C)}. \quad (4)$$

III.B.2.i.a. Details of Query Expansion for the Query Language Model

The automatic query expansion using search engine result snippets is a powerful technique that can leads to up to 5% accuracy gain against constant prior with P(v)=1 for all sites. In order to show the desirability of query expansion, the performance of a simplified vector matching algorithm in predicting queries at ten searchable web sites with high query volume is examined. Specifically, it is measured whether queries issued to a web site in test data match queries from the training data in terms of cosine similarity, without using any query expansion techniques.

For a searchable web site v, the first step is to obtain the sets $U_v$ of all unigrams and $B_v$ of all bigrams in queries issued to v are in the training data. In addition, frequencies $f_{x,v}$, where $f_{x,v}$ denotes the number of occurrences of $x \in U_v \cup B_v$ among queries submitted to v. For $x \notin U_v \cup B_v$, then set $f_{x,v}=0$. In addition, identical information is collected for a general purpose search engine, s. The associated unigrams and bigrams are denoted as $U_s$ and $B_s$, and the associated frequencies are denoted as $f_{x,s}$ for $x \in U_s \cup B_s$.

For a query q with distinct tokens $w_0, \ldots, w_n$, with frequencies $|w_0|, \ldots, |w_n|$ (where typically every $|w_i|=1$), compute the similarity between the query q and the vertical v is computed as, $$\cos(q, v) = \frac{\sum_{i=1}^{n} |w_i| f_{w_i,v}}{\sqrt{\sum_{i=1}^{n} |w_i|^2 \sum_{x \in U_v \cup B_v} f_{x,v}^2}}. \quad (11)$$

This cosine metric provides a relative ranking of searchable web sites suitable for each query. Whenever cos(q, v) is sufficiently greater than cos(q, s), then v is treated as a likely match to the user's search query. Note that this is a canonical document vector retrieval algorithm based on cosine similarity where, rather than representing a searchable web site v by the text on the site itself, v is represented by a virtual document constructed from all queries issued to v in the training data.

In order to the performance, it is determined which of the ten high-volume web sites are predicted for each query in the test data. If a website is predicted for the query and the query occurs on that site in the test data, then it is a true positive (TP). If the web site is predicted for the query and the site does not occur for the query, then it is a false positive (FP). If the web site is not predicted for the query but it occurs for the query in the test data, then it is a false negative (FN). Precision can be computed on a site-by-site basis as TP/(TP+FP) and recall can be computed as TP/(TP+FN). F1 can be computed as the harmonic mean of precision and recall.

III.B.2.ii. Second Component: Web Site Language Model P(w/v)

Figure 8:
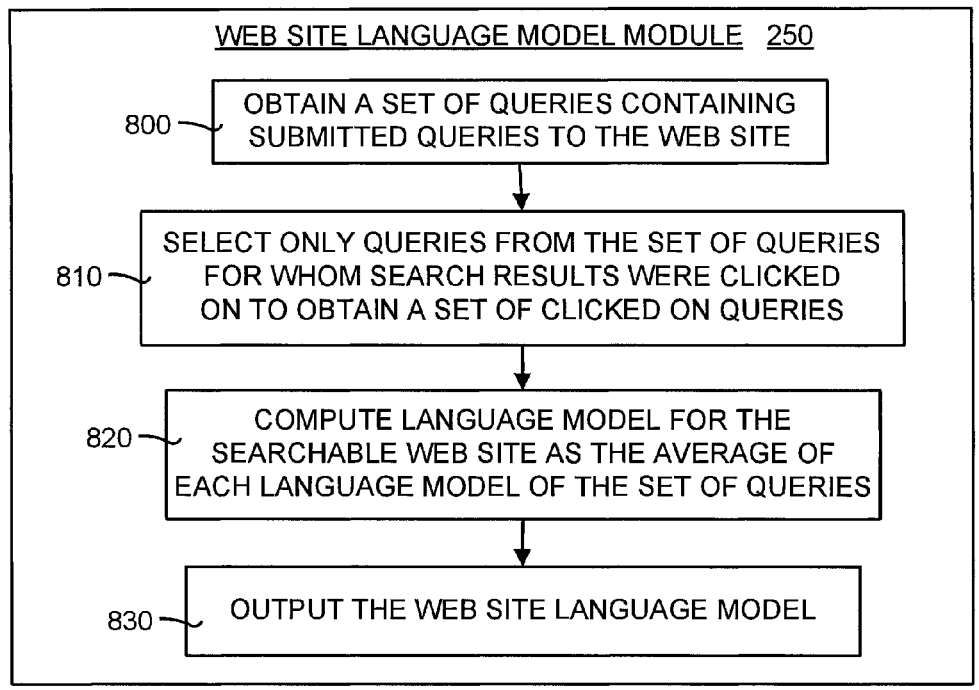
FIG. 8 is a flow diagram illustrating the operational details of embodiments of the web site language model module shown in FIG. 2.

FIG. 8 is a flow diagram illustrating the operational details of embodiments of the web site language model module 250 shown in FIG. 2. In order to model the conditional probability of the term w given the searchable site v, embodiments of the module 250 utilize the set of queries a containing all submitted queries to the site v (box 800). Embodiments of the module 250 selected only queries from the set of queries that had their search results clicked on (box 810). This yields a set of clicked on queries.

The language model for a searchable site v, P(w/v), is computed as the average of all language models of the queries (box 820). Embodiments of the module 250 then output web site language model (box 830). Mathematically, this can be written as, $$P(w \mid v) = \frac{1}{Z} \sum_{q \in Q_v} P(w \mid q) I(\# \text{ of click } (v, q) > 0), \quad (5)$$

where, $$Z = \frac{1}{\sum_{q \in Q_v} I(\# \text{ of click } (v, q) > 0)}$$

is a normalizing constant. This formula includes only queries whose search results are clicked on, as denoted in the indicator function I of the denominator of Z.

Since the queries extracted from each searchable site usually contain some noisy queries that are not representative of the site content, formulating the query language model for each searchable site with only clicked queries reduces the amount of noisy queries significantly. In addition, the formulation of the site does not require direct sampling from the site itself. This can reduce tremendously the amount of computational effort. In some embodiments this site-level formula is maintained and updated on a per-site basis. This embodiment is flexible and allows updating in real time.

III.B.2.iii. Third Component: Inverse Document Frequency 1/P(w)

Figure 9:
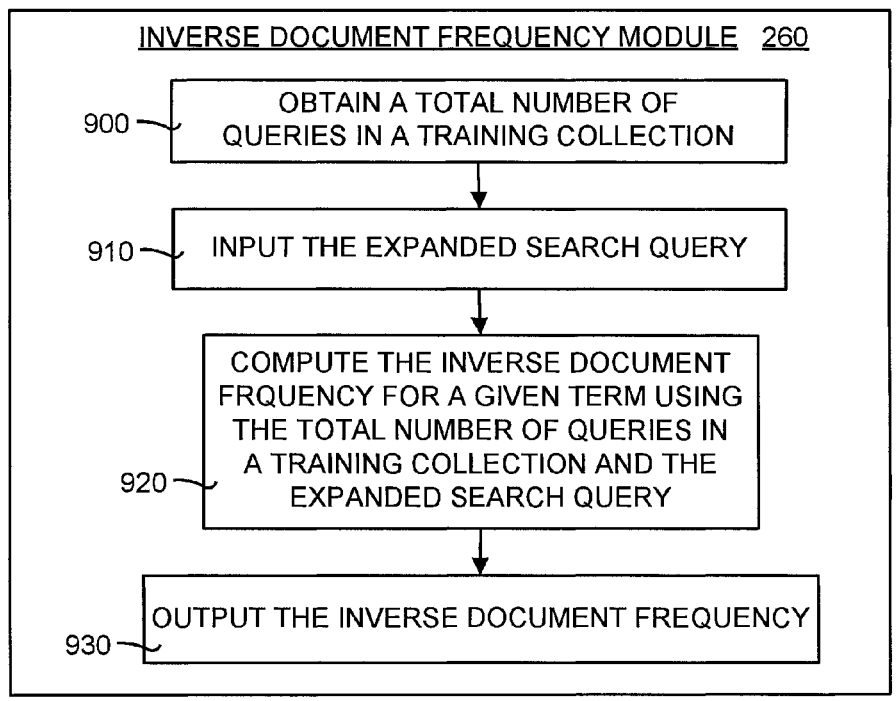
FIG. 9 is a flow diagram illustrating the operational details of embodiments of the inverse document frequency module shown in FIG. 2.

FIG. 9 is a flow diagram illustrating the operational details of embodiments of the inverse document frequency module 260 shown in FIG. 2. Embodiments of the module 260 first obtain a total number of queries in a training collection (box 900). In addition, the expanded search query is input (box 910). Next, embodiments of the module 260 compute the inverse document frequency for a given term using the total number of queries in the training collection and the expanded search query (box 920). The inverse document frequency then is output (box 930).

In particular, the third component in Equation (2), 1/P(w), is modeled as the inverse document frequency. Mathematically, this can be written as, $$\frac{1}{P(w)} \propto \log \frac{N}{|\{q^* : w \in q^*\}|}, \quad (6)$$

where N is the total number queries in the training collection. As is well-known, the inverse document frequency is able to assign higher weights to terms concentrated in a few documents of a collection rather than more general terms.

III.B.2.iv. Fourth Component: Static Rank P(v)

Figure 10:
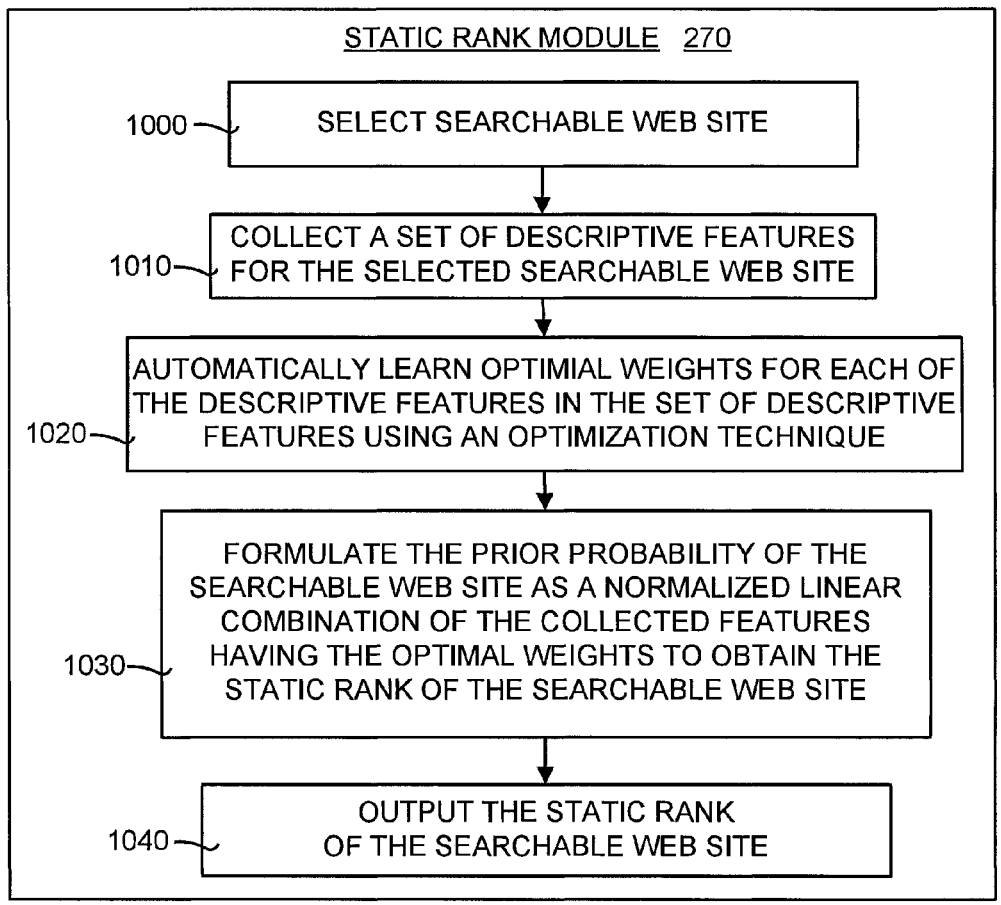
FIG. 10 is a flow diagram illustrating the operational details of embodiments of the static rank module shown in FIG. 2.

FIG. 10 is a flow diagram illustrating the operational details of embodiments of the static rank module 270 shown in FIG. 2. Embodiments of the module 270 first select a searchable web site (box 1000). Next, the set of descriptive features for the selected searchable web site are collected (box 1010). Embodiments of the module 270 then learn optimal weights for each of the descriptive features in the set of descriptive features using an optimization technique (box 1020). In some embodiments this optimization technique is a Simultaneous Perturbation for Stochastic Approximation (SPSA) algorithm, which is described below.

The set of descriptive features then are used to model the static rank of v, P(v). The prior probability P(v) of the searchable web site is formulated as a weighted normalized linear combination of the collected descriptive features having the optimal weights (box 1030). This yields the static rank of the searchable web site. Embodiments of the module 270 then output the static rank (box 1040).

In some embodiments the set of descriptive features contains seven descriptive features. Mathematically, this model can be written as, $$P(v) = w_1 \frac{\log[\text{queries}(v)]}{\sum_{v' \in V} \log[\text{queries}(v')]} + w_2 \frac{\log[\text{unique\_queries}(v)]}{\sum_{v' \in V} \log[\text{unique\_queries}(v')]} + \quad (7)$$

-continued $$w_3 \frac{\text{clicks}(v)}{\sum_{v' \in V} \text{clicks}(v')} + w_4 \frac{dt1(v)}{\sum_{v' \in V} dt1(v')} + w_5 \frac{dt2(v)}{\sum_{v' \in V} dt2(v')} +$$

$$w_6 \frac{\text{Index}(v)}{\sum_{v' \in V} \text{Index}(v')} + w_7 \frac{1/\text{entropy}(v)}{\sum_{v' \in V} 1/\text{entropy}(v')}.$$

In some embodiments in order to automatically learn the optimal weights $[w_1, \ldots, w_7]$ a Simultaneous Perturbation for Stochastic Approximation (SPSA) algorithm is used as the gradient approximation method for non-convex objective function. The SPSA approximation algorithm is well known and efficient and requires only two objective function evaluations per iteration for gradient approximation.

In general, for each iteration the SPSA algorithm generates a simultaneous perturbation vector $\Delta_k \in R^d$ according to the following conditions. First, $\Delta_k$ is a vector of d mutually independent mean-zero random variables $(\Delta_{k1}, \Delta_{k2}, \ldots, \Delta_{kd})$ satisfying $|\Delta_{k1}| \leq \alpha_0$ almost surely. Second, $E|\Delta_{k1}^{-1}| \leq \alpha 1$ for some finite $\alpha_0$ and $\alpha_1$.

Each $\Delta_{k1}$ can be generated from the symmetric Bernoulli distribution (+1 or −1 with equal probability). Given $\Delta_k$, the gradient approximation is computed as, $$\hat{g}_k(w_k) = \begin{bmatrix} 1/\Delta_{k1} \\ 1/\Delta_{k2} \\ \ldots \\ 1/\Delta_{kd} \end{bmatrix} \cdot \frac{L(w_k + c_k \Delta_k) - L(w_k - c_k \Delta_k)}{2c_k} \quad (8)$$

where $L(\bullet)$ is the objective function to be optimize. The objective function $L(w)$ is set to be the accuracy performance of the system. In addition, the parameters of the learning algorithm are set as the suggested values.

III.C. Displaying Results to a User

Embodiments of the searchable web site discovery and recommendation system 100 and method displays the ranked list of recommended searchable web sites 140 to a user. Any number of different interfaces may be used to display this list. In some embodiments, the interface lists the searchable web sites on the right-hand side of regular search results. Clicking on the link directs the user to the search result page of a recommended site of the given search query. This allows the user to experience much richer content information and ranking capability than with regular search results.

IV. Exemplary Operating Environment

Embodiments of the searchable web site discovery and recommendation system 100 and method are designed to operate in a computing environment. The following discussion is intended to provide a brief, general description of a suitable computing environment in which embodiments of the searchable web site discovery and recommendation system 100 and method may be implemented.

Figure 11:
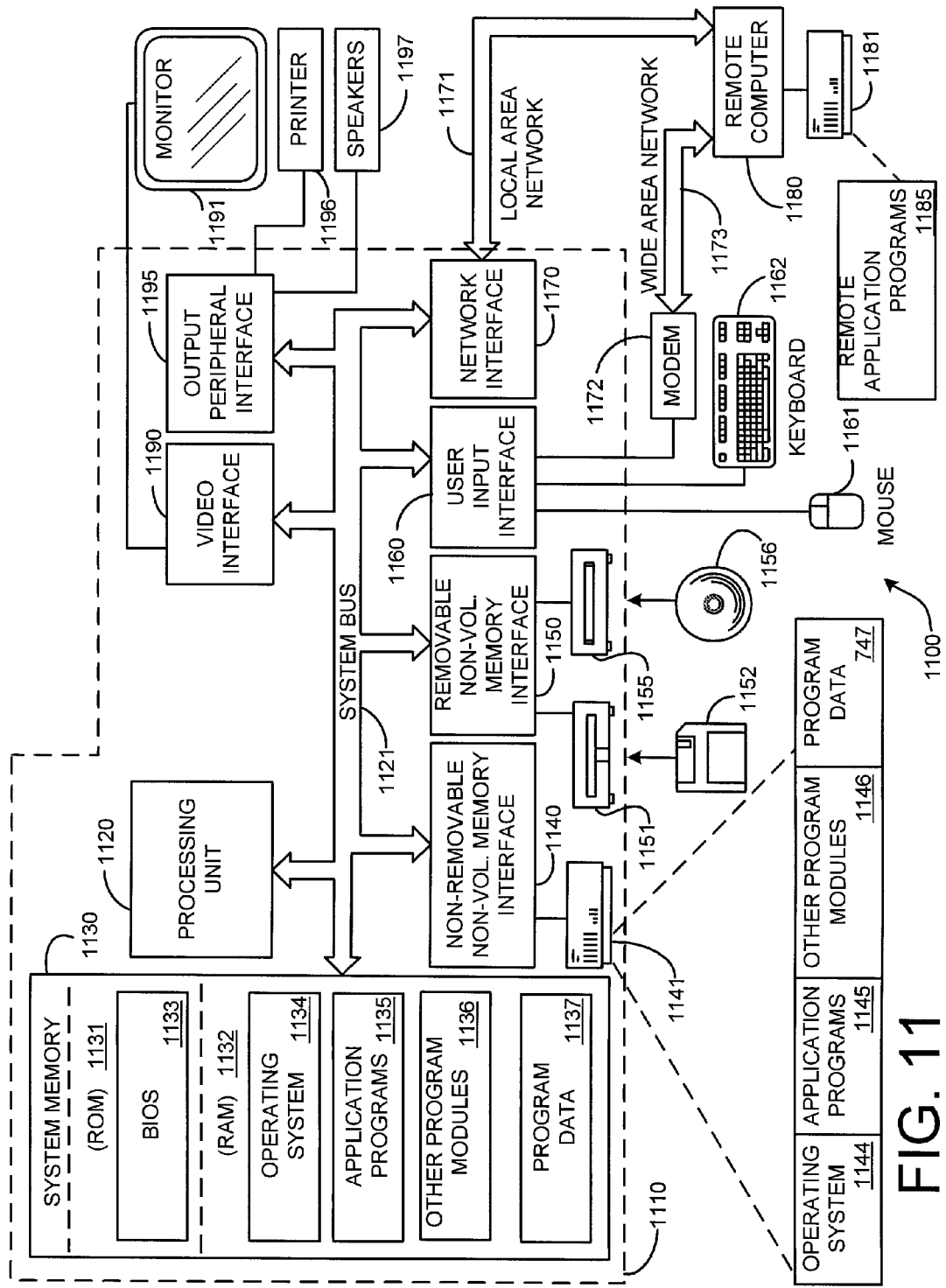
FIG. 11 illustrates an example of a suitable computing system environment in which embodiments of the searchable web site discovery and recommendation system and method shown in FIGS. 1-10 may be implemented.

FIG. 11 illustrates an example of a suitable computing system environment in which embodiments of the searchable web site discovery and recommendation system 100 and method shown in FIGS. 1-10 may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment.

Embodiments of the searchable web site discovery and recommendation system 100 and method are operational with numerous other general purpose or special purpose computing system environments or configurations. Examples of well known computing systems, environments, and/or configurations that may be suitable for use with embodiments of the searchable web site discovery and recommendation system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the searchable web site discovery and recommendation system 100 and method may be described in the general context of computer-executable instructions, such as program modules, being executed by a computer. Generally, program modules include routines, programs, objects, components, data structures, etc., that perform particular tasks or implement particular abstract data types. Embodiments of the searchable web site discovery and recommendation system 100 and method may also be practiced in distributed computing environments where tasks are performed by remote processing devices that are linked through a communications network. In a distributed computing environment, program modules may be located in both local and remote computer storage media including memory storage devices. With reference to FIG. 11, an exemplary system for embodiments of the searchable web site discovery and recommendation system 100 and method includes a general-purpose computing device in the form of a computer 1110.

Components of the computer 1110 may include, but are not limited to, a processing unit 1120 (such as a central processing unit, CPU), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer readable media. Computer readable media can be any available media that can be accessed by the computer 1110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1110. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within the computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information (or data) into the computer 1110 through input devices such as a keyboard 1162, pointing device 1161, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1120 through a user input interface 1160 that is coupled to the system bus 1121, but may be connected by other interface and bus structures, such as, for example, a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method comprising using a computing device having a processing unit to perform the following:
obtaining a list of searchable web sites, the list of searchable web sites including a first searchable web site to which users have submitted first queries and a second searchable web site to which the users have submitted second queries;
inputting another query received from an individual user;
computing probabilities of the searchable web sites given the another query, the probabilities including a first probability for the first searchable web site and a second probability for the second searchable web site;
ranking the searchable web sites based on the probabilities; and
creating a ranked list of searchable web sites based on the ranking,
wherein, in at least one instance, the ranked list of searchable web sites includes the first searchable web site to which the users have submitted the first queries and the second searchable web site to which the users have submitted the second queries.

2. The method of claim 1, further comprising:
obtaining query behavior from client-side query behavior logs by extracting data from the client-side query behavior logs to obtain a plurality of descriptive features for the searchable web sites, where the client-side query behavior logs are obtained by doing one or more of the following:
(a) extracting at least some of the data from client-side browsing logs;
(b) requesting query logs from searchable web site providers of the searchable web sites;
(c) obtaining idealized query sets that describe ideal queries and associated frequencies, the idealized query sets being obtained by authoring the ideal queries, by using click behavior to obtain the ideal queries, or by requesting the ideal queries from the searchable web site providers; or
(d) using random walks on a query-click graph of a general search engine.

3. The method of claim 2, further comprising:
determining static ranks for the searchable web sites using the plurality of descriptive features, and
computing the probabilities using the static ranks.

4. The method of claim 1, further comprising:
submitting the another query to a general search engine to obtain a query language model,
wherein the computing the probabilities is based at least in part on the query language model.

5. The method of claim 1, further comprising:
organizing activities within sessions in client-side query behavior logs according to time stamps; and
dividing searching tasks into search trails and non-search trails using the time stamps.

6. The method of claim 5, further comprising:
discovering the searchable web sites using the search trails to obtain the list of searchable web sites.

7. The method of claim 1, wherein the probabilities are computed using a probabilistic model having multiple components.

8. The method of claim 7, wherein the multiple components include a query language model that uses query expansion on the another query using snippets obtained from a general search engine.

9. The method of claim 7, wherein the multiple components include a web site language model that is based on multiple queries, including the first queries and the second queries, that have been submitted to the searchable web sites.

10. The method of claim 7, wherein an individual component is based on first inverse document frequencies associated with terms of the another query.

11. The method of claim 10, further comprising:
expanding the another query to obtain additional terms,
determining second inverse document frequencies for the additional terms, and
using the first inverse document frequencies and the second inverse document frequencies to compute the probabilities.

12. A system comprising:
computer-executable instructions configured to:
obtain a list of searchable web sites, the list of searchable web sites including a first searchable web site to which users have submitted first queries and a second searchable web site to which the users have submitted second queries,
input another query received from an individual user,
compute probabilities of the searchable web sites given the another query, the probabilities including a first probability for the first searchable web site and a second probability for the second searchable web site, and create a list of ranked searchable web sites based on the probabilities; and at least one processing unit configured to execute the computer-executable instructions, wherein, in at least one instance, the list of ranked searchable web sites includes the first searchable web site to which the users have submitted the first queries and the second searchable web site to which the users have submitted the second queries.

13. The system of claim 12, wherein the computer-executable instructions are configured to:

apply a pattern matching rule to extract an individual first query from a client-side query behavior log.

14. The system of claim 13, wherein the pattern matching rule includes a part of a uniform resource locator.

15. The system of claim 12, wherein the computer-executable instructions are configured to:

cause at least some of the ranked searchable web sites to be displayed to the individual user in response to the another query.

16. The system of claim 15, wherein the computer-executable instructions are configured to:

cause regular search results to be displayed to the individual user with the at least some of the ranked searchable web sites.

17. The system of claim 12, wherein the computer-executable instructions are configured to:

obtain query behavior using client-side query behavior logs; and obtain the list of searchable web sites by discovering the searchable web sites using the client-side query behavior logs.

18. One or more volatile or non-volatile computer storage media storing computer-executable instructions which, when executed by a processing unit of a computing device, cause the processing unit to perform acts comprising:

identifying searchable web sites including a first searchable web site to which users have submitted first queries and a second searchable web site to which the users have submitted second queries;

inputting another query received from an individual user;

computing probabilities of the searchable web sites given the another query, the probabilities including a first probability for the first searchable web site and a second probability for the second searchable web site; and ranking the searchable web sites based on the probabilities to obtain ranked searchable web sites, wherein, in at least one instance, the ranked searchable web sites include the first searchable web site to which the users have submitted the first queries and the second searchable web site to which the users have submitted the second queries.

19. The one or more volatile or non-volatile computer storage media of claim 18, the acts further comprising:

obtaining query behavior from client-side query behavior logs by extracting data from the client-side query behavior logs to obtain a plurality of descriptive features for the searchable web sites; and determining static ranks of the searchable web sites using the plurality of descriptive features, wherein the ranking is based on multiple components including a static rank component, the static rank component being based on the static ranks.

20. The one or more volatile or non-volatile computer storage media of claim 19, wherein the multiple components also include a query language model component, a web site language model component, or an inverse document frequency component.

* * * * *